(12) United States Patent
Dietl

(10) Patent No.: US 7,758,110 B2
(45) Date of Patent: Jul. 20, 2010

(54) DISPLACEABLE ROOF PART OF AN OPENABLE VEHICLE ROOF

(75) Inventor: Rudolf Dietl, Munich (DE)

(73) Assignee: Webasto AG, Stockdorf (DE)

( * ) Notice: Subject to any disclaimer, the term of this patent is extended or adjusted under 35 U.S.C. 154(b) by 97 days.

(21) Appl. No.: 12/093,274

(22) PCT Filed: Nov. 9, 2006

(86) PCT No.: PCT/DE2006/001963

§ 371 (c)(1),
(2), (4) Date: May 9, 2008

(87) PCT Pub. No.: WO2007/054080

PCT Pub. Date: May 18, 2007

(65) Prior Publication Data

US 2008/0277963 A1 Nov. 13, 2008

(30) Foreign Application Priority Data

Nov. 11, 2005 (DE) ........................ 10 2005 054 297

(51) Int. Cl.
*B60J 7/00* (2006.01)
(52) U.S. Cl. .............................. 296/216.02; 296/216.03
(58) Field of Classification Search ............ 296/216.03, 296/216.02
See application file for complete search history.

(56) References Cited

U.S. PATENT DOCUMENTS

| 7,104,598 B2 * | 9/2006 | Wingen ................. 296/216.03 |
| 2002/0008413 A1 | 1/2002 | Reinsch |
| 2003/0155795 A1 | 8/2003 | Dietl |

FOREIGN PATENT DOCUMENTS

| DE | 3739506 A1 | 6/1989 |
| DE | 10023844 C1 | 10/2001 |
| DE | 10203204 A1 | 8/2003 |
| DE | 10209901 A1 | 10/2003 |
| DE | 10211624 A1 | 10/2003 |
| EP | 1331121 A2 | 7/2003 |
| JP | 2002019469 | 1/2002 |

OTHER PUBLICATIONS

International Search Report dated Mar. 6, 2007 (6 pages).

* cited by examiner

*Primary Examiner*—Lori L Lyjak
(74) *Attorney, Agent, or Firm*—Fitch, Even, Tabin & Flannery; John M. Naber

(57) ABSTRACT

A roof part mounted movably by means of a bearing device on a bearing slide, which is mounted in a manner such that it can be shifted on a guide of the vehicle roof and can be displaced along the guide by means of a drive, wherein, for improved adjustment of the movable roof part, the roof part can be displaced relative to the bearing slide by means of an additional controllable adjusting device.

12 Claims, 9 Drawing Sheets

DISPLACEABLE ROOF PART OF AN OPENABLE VEHICLE ROOF

This application is a 35 U.S.C. §371 National Stage entry of PCT/DE2006/001963, filed Nov. 9, 2006, which claims priority from German Patent Application No.: DE 10 2005 054 297.2, filed Nov. 11, 2005, the contents of which are herein incorporated by reference.

The invention relates to a roof part of an openable vehicle roof, which is mounted movably by means of a bearing device on a bearing slide which is mounted in a manner such that it can be shifted on a guide of the vehicle roof and can be displaced along the guide by means of a drive.

DE 102 03 204 A1 has disclosed a folding roof of a vehicle, with a front roof part which is mounted movably by means of a four-bar linkage on a bearing slide which, in turn, is mounted on a roof-side guide track in a manner such that it can be shifted by means of a drive. A front link of the four-bar linkage is guided at a control slot which runs along the guide track and the front section of which has a profile which is downwardly curved toward the front. When the folding roof is closed, the front roof part is arranged in a lowered closed position, since the front link is pivoted downward by means of the downwardly curved profile of the control slot. To open the folding roof, the bearing slide is moved along the guide track in the direction of the open position by means of the drive, with the front link, in engagement with the rising control slot, initially being pivoted upward and therefore the front roof part inevitably being raised in relation to the bearing slide. Further opening of the folding roof or of the roof part takes place by shifting of the bearing slide, with the front link being pivoted into its upper position and maintaining the latter over the further course on account of the control slot which runs parallel to the guide track of the bearing slide. A raising or lowering of the front roof part therefore inevitably takes place on the basis of the position of the bearing slide and of the fixed profile of the control slot, and cannot be influenced.

DE 102 11 624 A1 likewise shows a vehicle with a folding top, the roof peak of which is mounted movably on a respective lateral slider by means of a four-bar linkage. The slider is mounted on a roof-side lateral guide in a manner such that it can be shifted by means of a drive. A front link of the four-bar linkage is guided by means of a guide element on a slotted track which is forwardly lowered in its front section. When the slider is moved into its front end position, the guide element, which is guided downward on the slotted track, pivots the front link downward such that the roof peak is moved into its lowered closed position.

DE 100 23 844 C1 has disclosed an openable vehicle roof, the front roof part of which can be displaced along lateral guide rails by means of a drive. The roof part is mounted on both sides by means of a respective four-bar linkage on a slide which can be shifted on the guide rail. In the region of the front end of the guide rail, a control lever of the four-bar linkage is in engagement via an engagement part with a control slot which controls a movement of the roof part relative to the slide as a function of the position of the slide with respect to the guide rail and with respect to the control slot.

It is the object of the invention to provide a roof part which is mentioned at the beginning and has improved displaceability.

This object is achieved according to the invention in the abovementioned roof part in that the roof part can be displaced relative to the bearing slide by means of an additional controllable adjusting device.

Advantageous refinements of the invention are indicated in the subclaims.

Whereas, in the case of the known bearing and displacement devices of the roof part, a lifting and/or inclination adjustment is dependent on the position of its bearing slide on the guide and therefore on the position relative to a fixed control slot, with the solution according to the invention location, time and magnitude of the displacement of the roof part relative to the bearing slide can be undertaken independently of the position or movement of the bearing slide. An individual pivoting movement which is combined with the longitudinal shifting can therefore be transmitted to the roof part and, during the closing operation, compress the roof part, for example obliquely downward, against a seal on the cowl. The adjusting device can then expediently be activated by means of an actuating device which can be operated by the driver. Furthermore, the roof part can be adjusted in its height and/or inclination in relation to the vehicle roof or top as a function of the incident flow, with it being possible for a control device to preferably be provided for the automatic actuation. In the case of a folding top, which can be put away, of a convertible, when the top is put away the roof part, which is formed, for example, by a front bow, can be varied in its lifting position and, in particular, can be lowered in order to improve the view to the rear or the visual appearance of the vehicle.

According to a simple design, it is provided that the adjusting device has its own actuator which is arranged, for example, in the region of the drive of the bearing slide on a roof part, such as, for example, a transverse member or transverse bow. The drive and the actuator are, for example, electric geared motors or hydraulic motors. On the other hand, it is possible for the adjusting device to be able to be actuated by the drive of the bearing slide by means of a controllable adjusting mechanism. In this case, the drive or driving motor of the bearing slide takes on the two driving and adjusting movements on the basis of the activation by means of a corresponding control device.

If the roof part is mounted movably on the bearing slide by means of a link device, and the adjusting device is coupled to one of the links, the displacement can be undertaken in a simple manner by engagement on said link, with diverse possibilities for the designing of the engagement being able to be realized. For example, the adjusting device can have a sliding component which is guided along a guide track and is in engagement with the bearing device of the roof part and at a control slot of the link, and, by means of a relative movement of the sliding component in relation to the bearing slide, the link can be pivoted on the bearing slide. The dedicated guide track for the sliding component or in general for the engagement component means that the control slot known from the prior art is not required, and therefore resultantly caused joints or transitions to a divergence of the control slot from the main guide are not present in the solution according to the invention.

If the drive and the actuator are respectively connected to the bearing slide and the slider via driving cables, the dimensions of said two driving cables can be smaller because of the division of the driving movement between them. Similarly, the two drives formed in particular as electric motors can be designed to be less powerful and their dimensions can be smaller.

In addition to the guide of the bearing slide, the guide rail preferably contains a lower guide track for the driving cable of the bearing slide and an upper guide track for the sliding component and the driving cable thereof. According to a preferred refinement, the upper guide track can be lowered in its front track section relative to the guide of the bearing slide, and therefore structural advantages can arise when defining the kinematics of the four-bar linkage for the purpose of pivoting the controlled link downward.

Accordingly, the drive of the bearing slide and the adjusting device can preferably be controlled in such a manner that, in at least one position of the bearing slide, the roof part can be adjusted in its vertical position and/or in its pivoted position. Furthermore, the drive and the adjusting device can be controlled in such a manner that the roof part can be displaced into a defined position while the bearing slide is at rest and also while it is moving.

The roof part is expediently a front bow or a roof peak, in particular of a folding top of a convertible.

In a further refinement of the invention, at least two of these roof parts can be mounted on the respective guide and can be displaced by the drive and the adjusting device.

Furthermore, the roof can be a lamella roof, and the at least one roof part is a lamella of said roof. In principle, the roof part can be used in all types of folding roofs or even lamella roofs which can close a roof opening in a fixed roof or in a roof which can be put away.

Exemplary embodiments of the roof part together with its bearing device and displacement device are explained in more detail below with reference to the drawing, in which.

Figure 1:
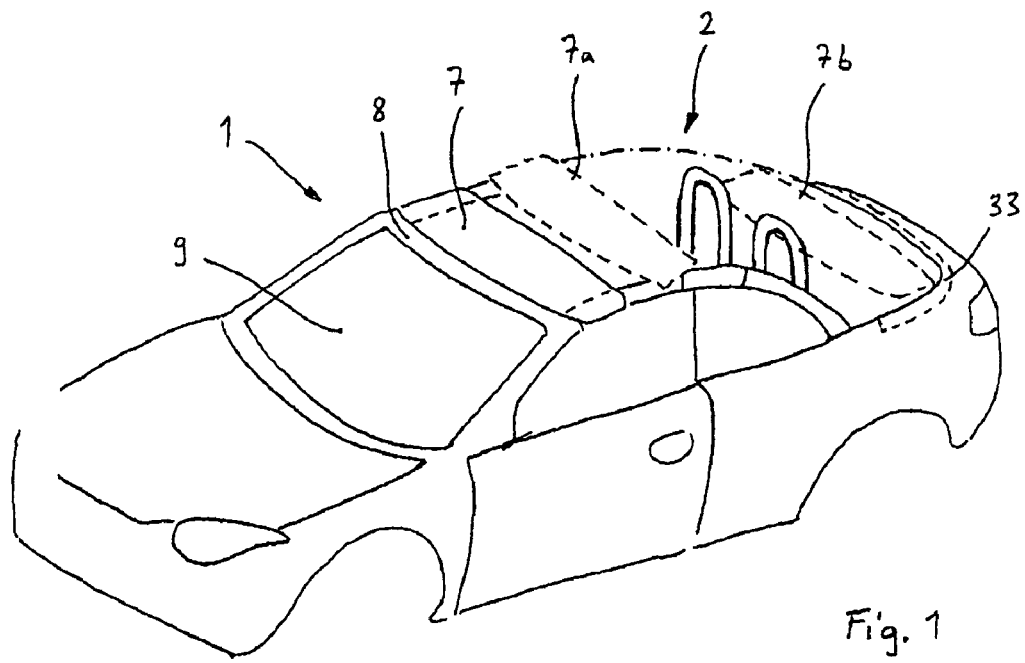
FIG. 1 shows, in a top view, a convertible vehicle with a folding top, the movable roof peak of which is illustrated in the closed position and also in the open position and put-away position (in each case by dashed lines)
Figure 2:
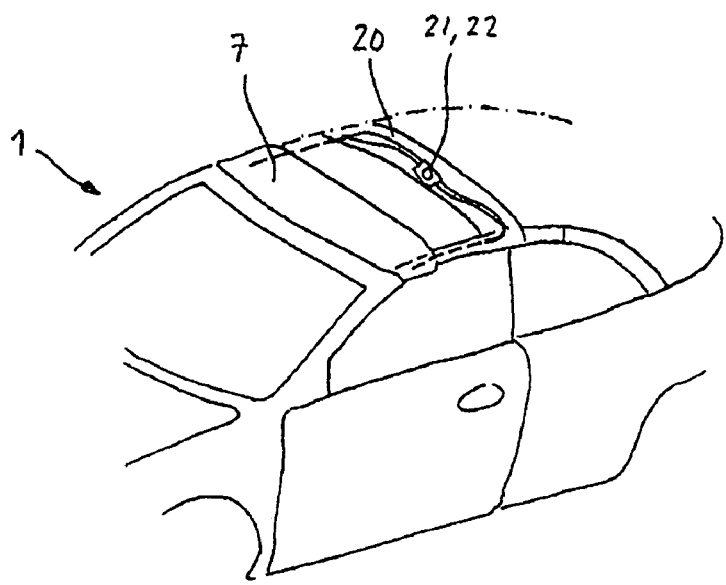
FIG. 2 shows, in a top view according to FIG. 1, the vehicle with the closed folding top and a schematically illustrated displacement device of the movable roof peak.
Figure 3:
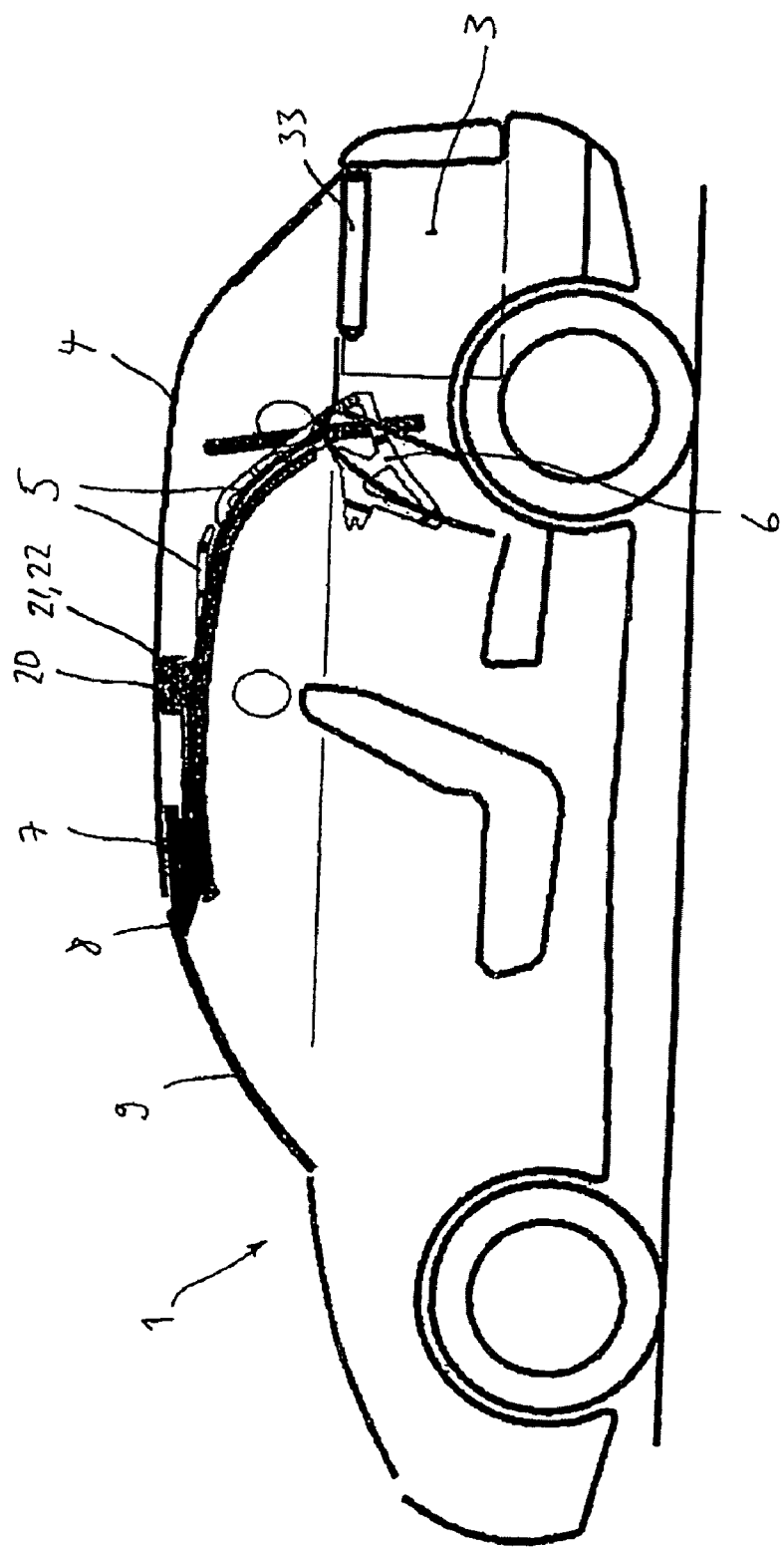
FIG. 3 shows, in a side view and in a schematic illustration, the vehicle with a closed top.
Figure 4:
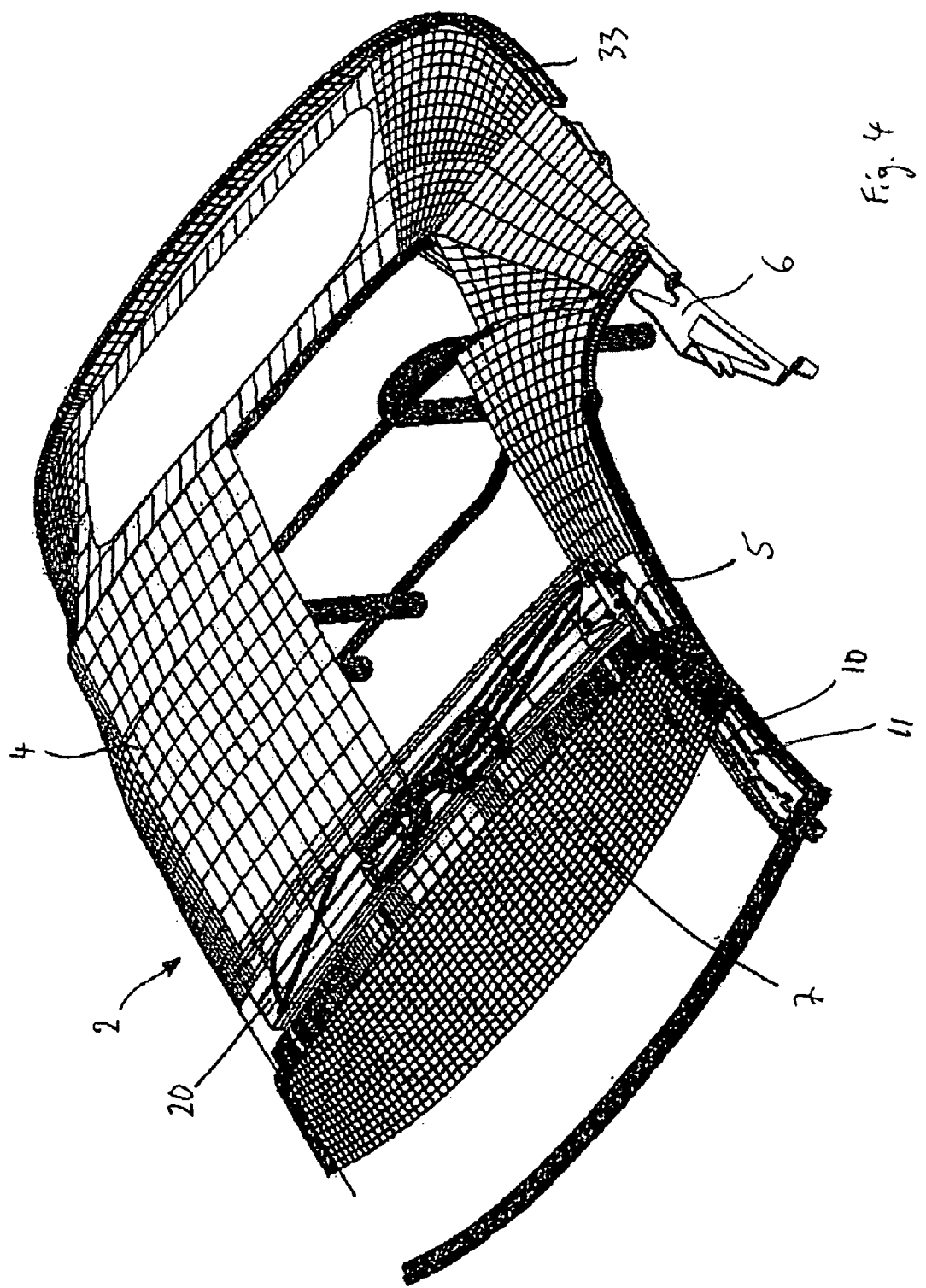
FIG. 4 shows, in a top view, the folding top, the roof peak of which is displaced into a partial opening position.

A convertible vehicle 1 contains a movable folding top 2 which can be lowered so as to open it and can be displaced in a known manner between a closed position covering the vehicle interior (FIGS. 1 to 3) and an open or put-away position which opens up the vehicle interior and in which it takes up a put-away position at the rear, in particular above a trunk 3. A folding top of this type is disclosed, for example, in DE 101 02 643 A1 and DE 199 39 954 A1., The folding top 2 contains a folding-top linkage 5 which supports a folding-top cloth 4, is mounted on both sides on a body-mounted main bearing 6 by means of folding-top kinematics, for example by means of two links in a four-bar linkage arrangement, and can be displaced between the closed position and the put-away position. A roof peak of the folding top 2 is formed by a front bow 7 which is essentially designed as a two-dimensional shell, is connected to the folding-top cloth 4 or is spanned by the latter and, when the folding top 2 is closed, can be displaced between its closed position, in which it bears against a cowl 8 or against a seal fitted thereto above the windshield 9 (FIGS. 1 to 3), and an open position, in which on guide rails 10 which are arranged on both sides and are arranged on a respective lateral front linkage limb 11 of the folding-top linkage 5 (see FIG. 1, dashed-line illustration 7a, and also FIG. 4). When the folding top 2 is basically closed, a front partial opening of the folding top 2 can therefore be set, for example for ventilation purposes, while the lateral front linkage limbs 11 remain locked to the cowl 8 or the A pillars.

Figure 5:
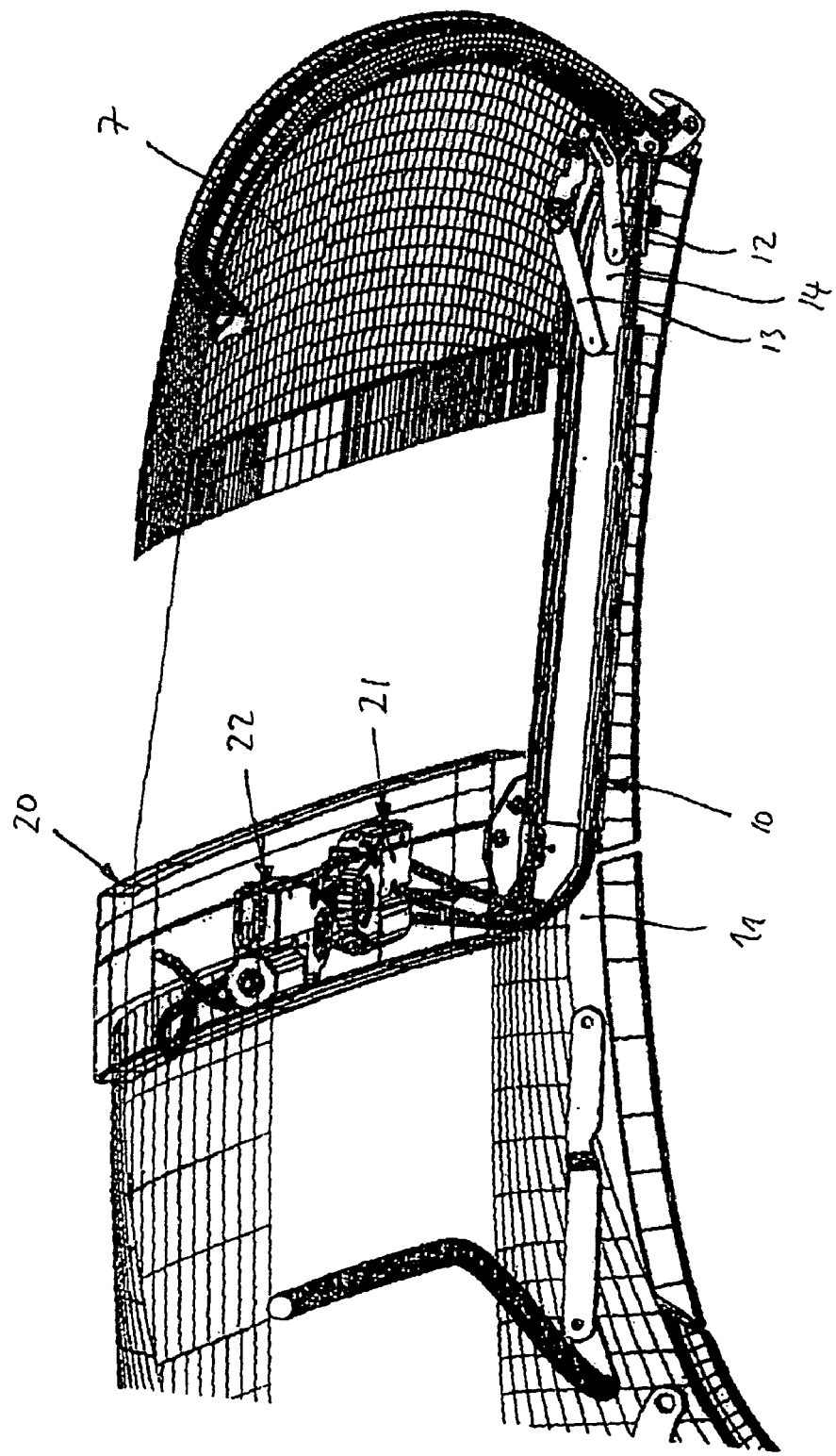
FIG. 5 shows, in a lateral inner or bottom view, the closed folding top with the displacement device of the front bow.
Figure 6:
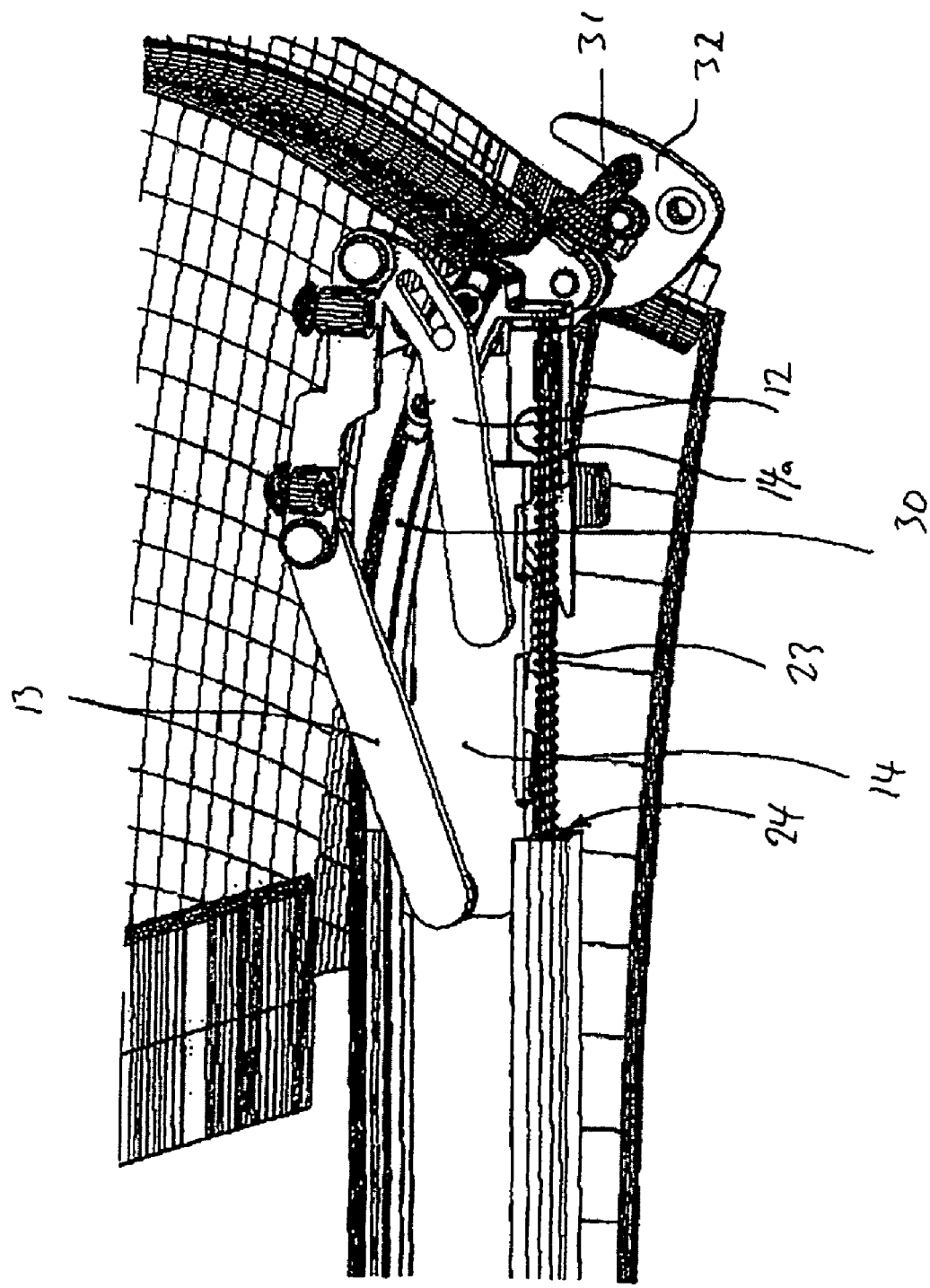
FIG. 6 shows, in a view according to FIG. 5, an enlarged detail with the displacement device.
Figure 7:
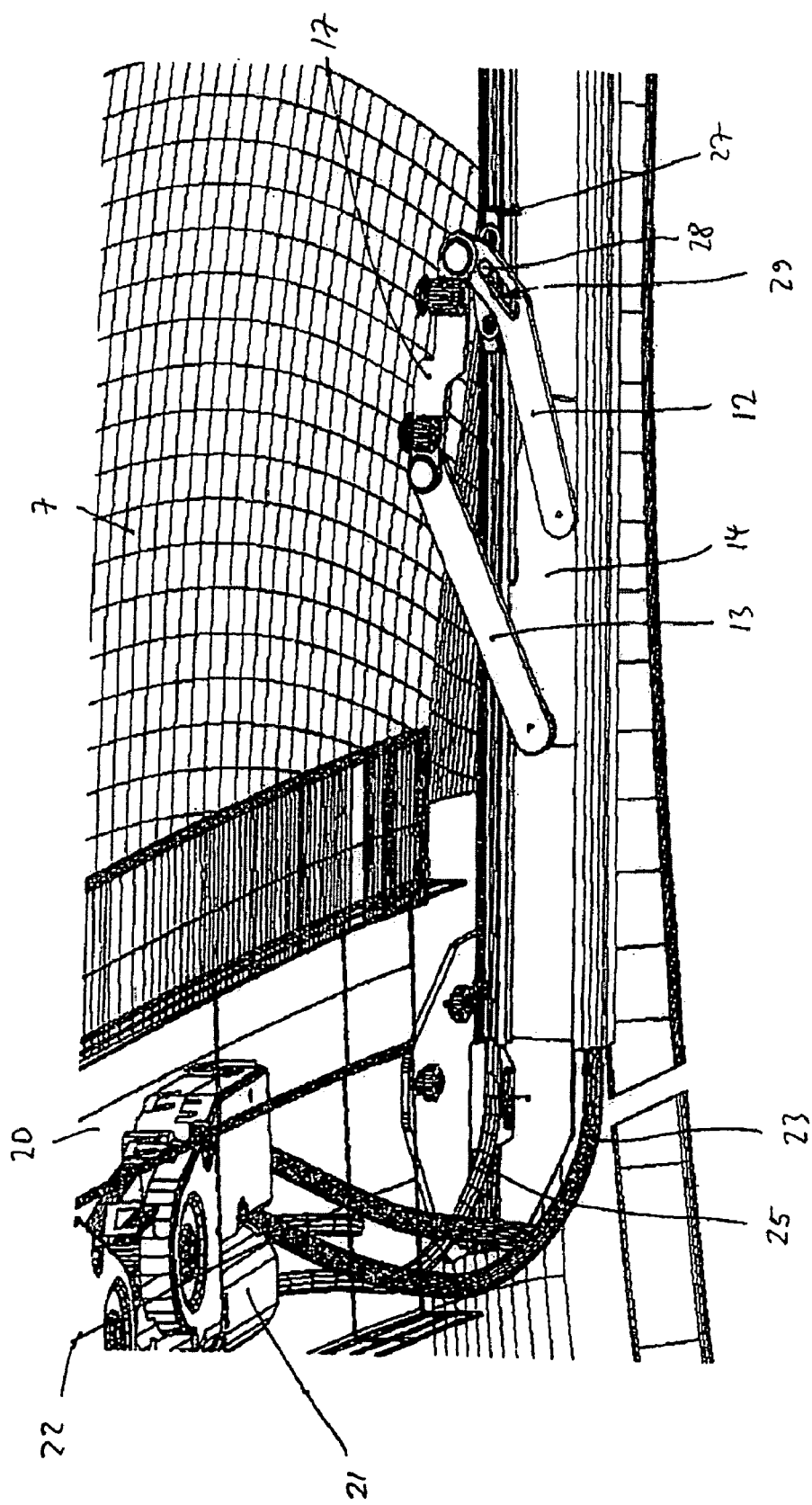
FIG. 7 shows, in an enlarged illustration of a view according to FIG. 5, the front bow in an open and lowered position in which it is shifted to the rear on the guide rail.

The front bow 7 is mounted movably on both sides, in each case by means of a four-bar linkage containing a front link 12 and a rear link 13 (see in particular FIGS. 5 and 6), on a bearing slide 14 which is arranged in a manner such that it can be shifted on the lateral guide rail 10. The two links 12, 13 are mounted pivotably at one end on the bearing slide 14, in joints 15 and 16, respectively, and at the other end on a holder 17, to which the front bow 7 is fastened, in joints 18 and 19, respectively.

A transverse bow 20 connects the two lateral guide rails 10 to each other and the front linkage limbs 11 to each other approximately in the region of the rear ends of the two guide rails 10. A driving device with a driving motor 21 as the main drive for the shifting of the bearing slide 14 along the guide rail 10, and a servomotor 22 as an additional drive for setting a lifting and/or inclination position of the front bow 7 relative to the bearing slide 14 and therefore to the guide rail 10 and the linkage limb 11 are arranged on the transverse bow 20. A first compression-resistant driving cable 23 runs in each case from the driving motor 21 to a lower guide track 24 of each of the guide rails 10 on both sides and is fixedly connected to the bearing slide 14. A second compression-resistant driving cable 25 runs in each case from the servomotor 22 to an upper guide track 26 of each of the guide rails 10 on both sides and is connected fixedly to a slider 27 or the like which is guided in a manner such that it can be shifted on the guide rail 10 and has a control pin 28 which is in engagement at a slotted guide 29 of the front link 12, for example at an elongated hole formed on the link 12. For the driving cables 23 and 25 on both sides, which are identical to the driving cables of sliding roof drives, both the driving motor 21 and the servomotor 22 have worm wheels which are in engagement with the driving cables 23 and 25.

The upper guide track 26 can run over its entire length parallel to the guide rail 10 or, according to the exemplary embodiment illustrated, it is lowered in its front track section 30 in the direction of the lower guide track 24 such that the slider 27 is lowered relative to the guide rail 10 while it is moving forward into its front end position. In order to better illustrate the driving cable 23 and its connection to a fastening part 14a connected to the bearing slide 14, the front section of the lower guide track 24 is not illustrated in FIGS. 5 and 6.

When the folding top 2 is closed, each linkage limb 11 is held in a centered closed position on the cowl 8 by means of a centering peg 31 and is kept locked thereto by means of a latch 32. The bearing slide 14 is shifted into its front end position by the driving motor 21 and the driving cable 23. The slider 27 is likewise arranged in its front lowered end position and is in such a relative position to the bearing slide 14 that, in a lower end position, it is arranged in the slotted guide 29 of the front link 12. The slider 27 has therefore pivoted the front link 12 and therefore the four-bar linkage and the front bow 7 downward such that the front bow 7, in its closed position, is arranged on the cowl 8.

When the folding top 2 is closed, the front bow 7 can be opened and displaced into a different position by actuation of the servomotor 22 and also by common actuation of the servomotor 22 and of the driving motor 21. If only the servomotor 22 is actuated and, as a result, the slider 27 is shifted to the rear along the upper guide track 26 while the bearing slide 14 remains unchanged, then, by movement of the control pin 28 in the slotted guide 29, the front link 12 and therefore the four-bar linkage are pivoted upward, thus raising the front bow 7 out of the surface of the closed folding top 2 and from the cowl 8 and, in the process, shifting it rearward or adjusting it in its inclination in accordance with the kinematics of the four-bar linkage. The front bow 7 therefore takes up a first ventilation position. If the driving motor 21 is additionally also actuated initially or in a manner staggered in time, then, for the lifting movement of the front bow 7, its shifting along the guide rail 10 by means of the moving bearing slide 14 is also brought about.

Figure 8:
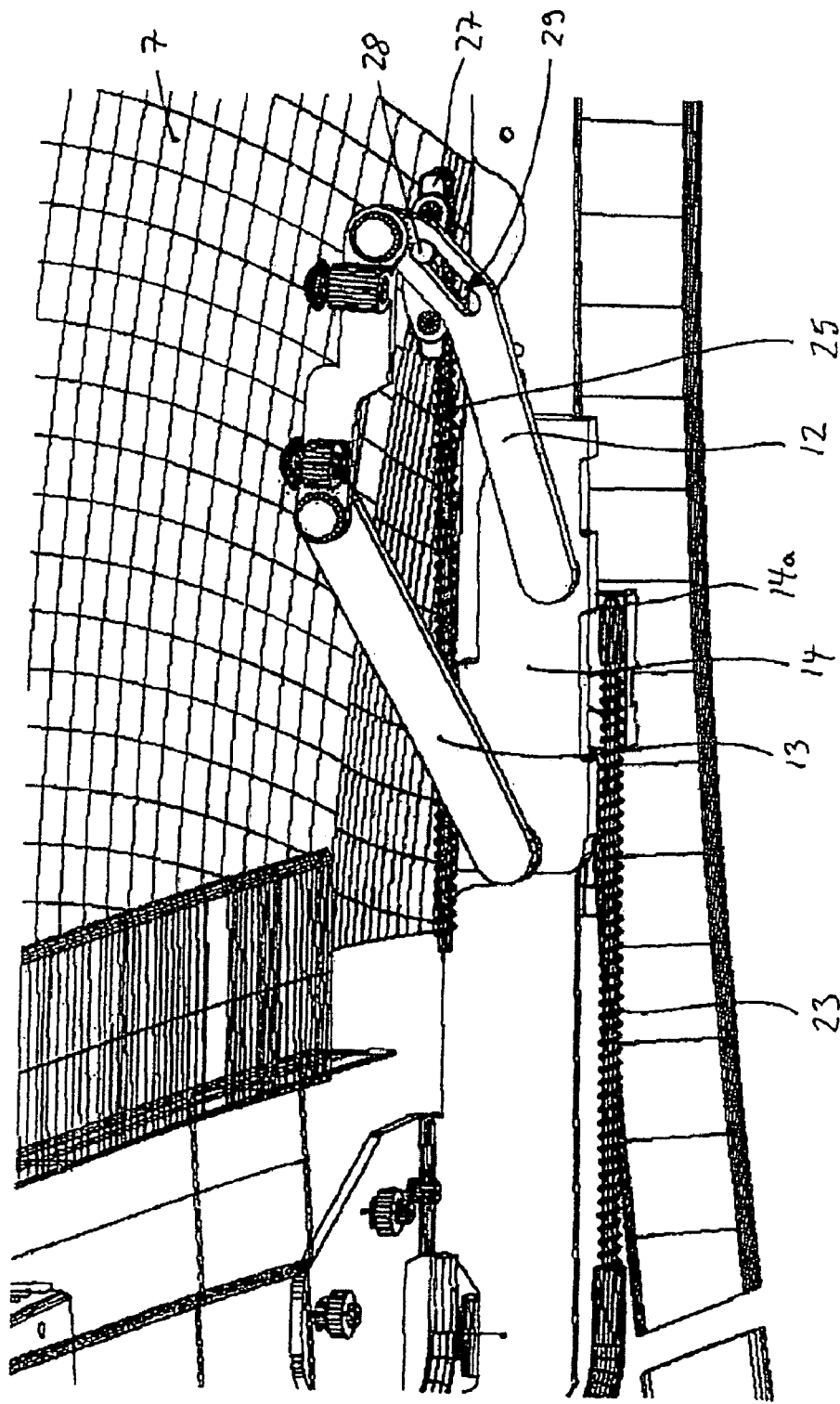
FIG. 8 shows, in a view according to FIG. 7, the front bow in the open lowered position, with the guide rail not being illustrated.
Figure 9:
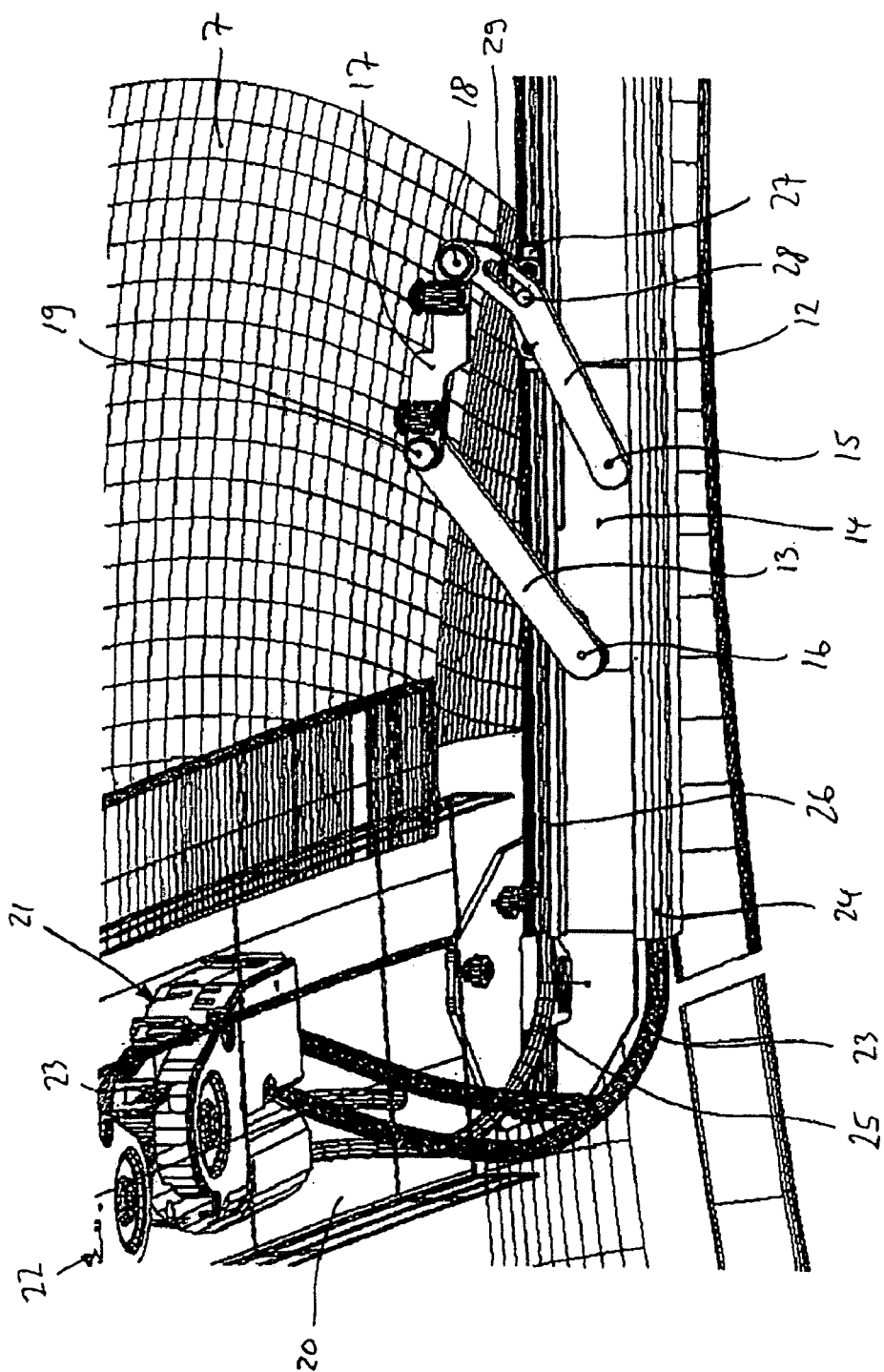
FIG. 9 shows, in a view according to FIG. 7, the front bow in the open, but raised, position.

When the driving motor 21 and the servomotor 22 are actuated at a mutually coordinated displacement speed, the front bow 7 can be shifted by means of the bearing slide 14, which moves along the guide rail 10, out of its closed position on the cowl 8 into a partial opening position or into its end position in front of the transverse bow 20, with the front bow 7 only being slightly raised, if at all. In the partial opening position and also in the end position, the slider 27 can be shifted relative to the bearing slide 14 by actuation of the servomotor 22 such that the front bow 7, which is still lowered, can be raised or, if it is in a raised position, can also be lowered again from a lifting position (FIG. 8: lowered position of the front bow 7, FIG. 9: raised position of the front bow 7).

When the front bow 7 is arranged in its end position or else even during its opening movement, the two linkage limbs 11 can be released from the cowl 8 after the latch 32 is opened, and therefore the folding top 2 can be moved in a known manner into its put-away position at the rear.

In particular when the folding top 2 is opened and put away, the lowering of the raised front bow 7 is advantageous if said folding top, in its put-away position, takes up a comparatively high position above the trunk 3 on a rear folding-top clamping hoop 33 and, by lowering the front bow 7 arranged in particular in its end position, the view of the driver to the rear is less obstructed.

The front bow 7 can also form the roof peak of a folding top for a roof opening of a vehicle with fixed longitudinal roof struts or a fixed roof surface containing the roof opening. In this case, the guide rails 11 are arranged on the longitudinal roof struts or on lateral frame parts which are fitted next to the roof opening and are mounted on the roof, and the driving and servomotors are mounted on the roof.

Figure 10:
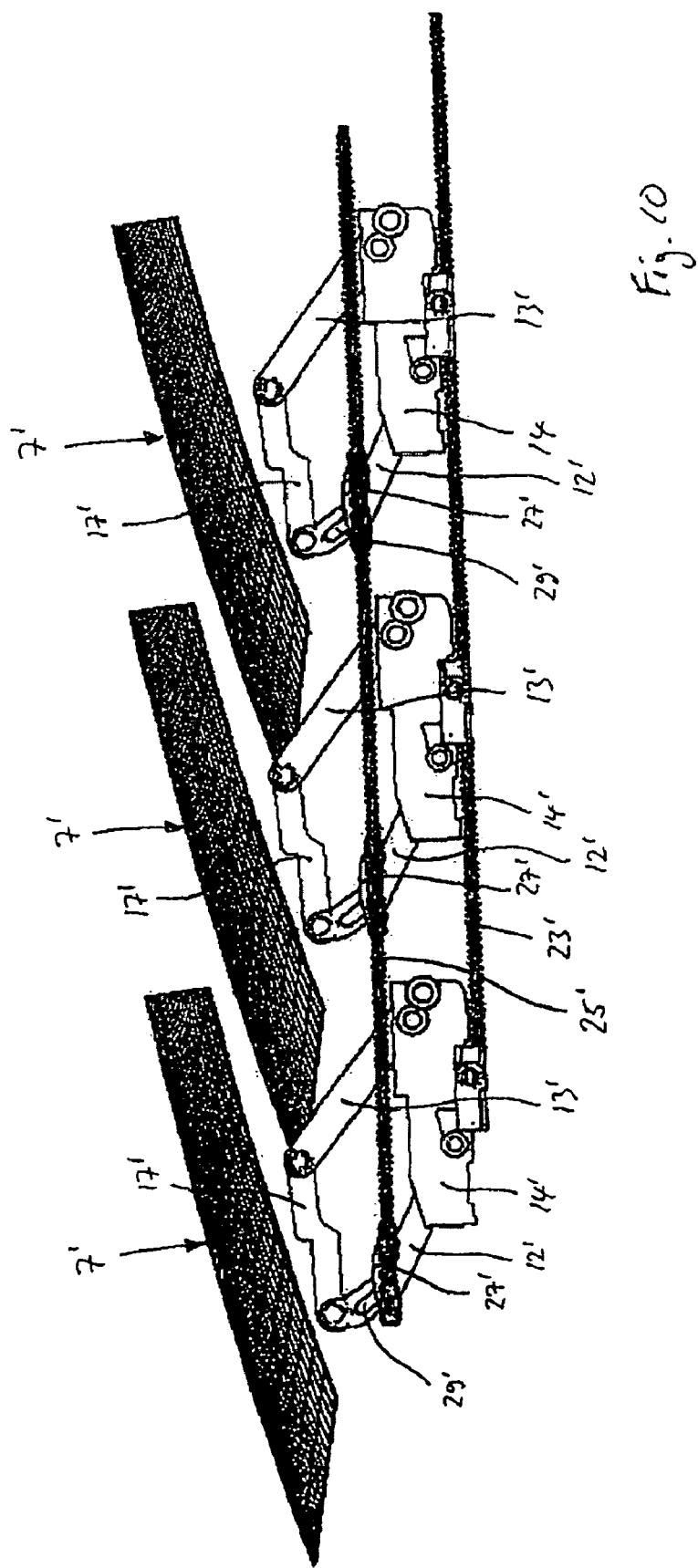
FIG. 10 shows, in a side view, three consecutively arranged lamellas of a lamella roof of a vehicle, with the lamellas being mounted and being movable by means of identical displacement devices according to the invention.

FIG. 10 shows a further modified exemplary embodiment in which three roof parts or lamellas 7', in particular formed identically, of a lamella roof, as is basically known, for example, from DE 41 29 860 C1, are guided on a lateral guide rail (not illustrated) in a manner such that they can be shifted by means of respective bearing slides 14' (components identical to the first exemplary embodiment are provided with the same reference numbers). A first driving cable 23' which can be driven by a driving motor connects the bearing slides 14' to each other at a defined distance and accordingly shifts them as a unit. A second driving cable 25' which can be driven by a servomotor connects the sliders 27' of the three front links 12' of the respective four-bar linkages supporting the lamellas 7'. Here too, by means of different combinations of the movements of the two driving motors or driving cables 23' and 25', diverse settings and adjustments of the lamellas 7' can be undertaken in a manner corresponding to the front bow 7 described above.

In a departure from the embodiment illustrated, the adjusting movement of the adjusting device for displacing the front bow 7 relative to the bearing slide can also take place via an adjusting mechanism which is coupled to the drive of the bearing slide and can produce a controllable adjusting movement via said drive. A dedicated actuator or servomotor is then not required.

The invention claimed is:

1. A roof part of an openable vehicle roof, which is mounted movably by means of a bearing device on a bearing slide which is mounted in a manner such that it can be shifted on a guide of the vehicle roof and can be displaced along the guide by means of a drive, characterized in that the roof part can be displaced relative to the bearing slide by means of an additional controllable adjusting device; and characterized in that the adjusting device has its own actuator or can be actuated by the drive of the bearing slide by means of a controllable adjusting mechanism.

2. A roof part of an openable vehicle roof, which is mounted movably by means of a bearing device on a bearing slide which is mounted in a manner such that it can be shifted on a guide of the vehicle roof and can be displaced along the guide by means of a drive, characterized in that the roof part can be displaced relative to the bearing slide by means of an additional controllable adjusting device; characterized in that the roof part is mounted movably on the bearing slide (14) by means of a link device, and the adjusting device is coupled to one of the links.

3. The roof part of claim 2, characterized in that the adjusting device has a sliding component which is guided along a guide track and is in engagement with the bearing device of the roof part and at a control slot of the link, and in that, by means of a relative movement of the sliding component in relation to the bearing slide, the link is pivoted on the bearing slide.

4. The roof part of claim 1, characterized in that the drive of the bearing slide and the adjusting device can be controlled in such a manner that, in at least one position of the bearing slide, the roof part can be adjusted in its vertical position and in its pivoted position.

5. The roof part of claim 1, characterized in that the drive and the adjusting device can be controlled in such a manner that the roof part can be displaced into a defined position while the bearing slide is at rest and also while it is moving.

6. A roof part of an openable vehicle roof, which is mounted movably by means of a bearing device on a bearing slide which is mounted in a manner such that it can be shifted on a guide of the vehicle roof and can be displaced along the guide by means of a drive, characterized in that the roof part can be displaced relative to the bearing slide by means of an additional controllable adjusting device; characterized in that the drive and the adjusting device are respectively connected to the bearing slide and the sliding component by means of a respective compression-resistant driving cable.

7. The roof part of claim 6, characterized in that the guide rail has a lower guide track for the driving cable of the bearing slide and an upper guide track for the sliding component and the driving cable thereof.

8. The roof part of claim 7, characterized in that the upper guide track is lowered in its front track section relative to the guide of the bearing slide.

9. The roof part of claim 1, characterized in that the roof part is a front bow or a roof peak.

10. The roof part of claim 1, characterized in that at least two of these roof parts are mounted on the guide and can be displaced by the drive and the adjusting device.

11. The roof part of claim 1, characterized in that the roof is a displaceable folding top of a convertible.

12. The roof part of claim 1, characterized in that the roof is a lamella roof, and in that the at least one roof part is a lamella of said roof.

* * * * *